United States Patent [19]

Dickmann

[11] Patent Number: 4,678,199

[45] Date of Patent: Jul. 7, 1987

[54] VEHICLE TRAILER HITCH

[76] Inventor: Thomas Dickmann, Erich-Heckel-Strasse 63, 7500 Karlsruhe 41, Fed. Rep. of Germany

[21] Appl. No.: 931,270

[22] Filed: Nov. 17, 1986

[30] Foreign Application Priority Data

Nov. 23, 1985 [DE] Fed. Rep. of Germany ....... 3541520
Jun. 4, 1986 [DE] Fed. Rep. of Germany ....... 3618809

[51] Int. Cl.⁴ ............................................. B60D 1/06
[52] U.S. Cl. ............................... 280/491 E; 280/495; 280/511
[58] Field of Search ................... 280/491 E, 495, 511, 280/504, 506

[56] References Cited

U.S. PATENT DOCUMENTS 2,877,025  3/1959  Jay ........................................ 280/495
3,837,679  9/1974  Dickmann ............................ 280/511

FOREIGN PATENT DOCUMENTS 2935385  3/1981  Fed. Rep. of Germany ...... 280/511
3013408  10/1981  Fed. Rep. of Germany ...... 280/511

*Primary Examiner*—John J. Love
*Assistant Examiner*—Donn McGiehan

[57] ABSTRACT

A trailer hitch for a vehicle comprises a support tube structure which is to be mounted to a vehicle and which removably carries a hitch ball bar. An engagement structure is provided which firmly locks the ball bar to the support tube structure with the aid of a safety bolt which is axially movably disposed in the ball bar and adapted to project from its end within the support tube structure and to lock the ball bar in the support structure in rattle-free engagement therewith. Preferably, the safety bolt is operable by a mechanism extending through the ball bar and the hitch ball so that the safety bolt cannot be actuated when a trailer tongue is disposed on the hitch ball.

19 Claims, 11 Drawing Figures

VEHICLE TRAILER HITCH

BACKGROUND OF THE INVENTION

The invention relates to a trailer hitch for vehicles, especially for motor vehicles, which hitch comprises a mounting support including a support tube for connection to the vehicle and a ball carrying bar which is received and detachably mounted in the support tube.

Vehicle trailer hitches of this type are known, for example, from the German DOS Nos. 1655012 and 3004285. With the hitches disclosed therein however it is necessary to manually insert a safety bolt into the support tube for locking the ball carrying bar in engagement with the support tube. This is considered to be a disadvantage. Also it is noted that omission of the locking procedure or mere partial insertion of the safety bolt results in trailering operations with such hitch that are unsafe.

An arrangement as disclosed in German DOS No. 3327051 tries to overcome the disadvantage pointed out above by providing a spring-loaded safety bolt providing a force which retains the safety bolt in its locking position. In order to compress the spring, there is provided a lever adapted to act on an operating ring which lever needs to be operated in order to disengage the ball carrying bar from the support tube and which, at the same time, causes the compression of the spring. Upon insertion of the ball carrying bar into the support tube, that is, when the spring is to move the safety bolt into its locking position, the operating ring and together therewith the operating lever are pivoted. During this operation it is however possible that movement of the operating ring and the operating lever is obstructed by foreign objects so that the safety bolt will not assume its fully inserted locking position without this fact being noticed by the operator.

An improvement is provided by the arrangement according to the European Patent Application No. 84 108 847.9 wherein, unlike with the arrangement according to DE OS No. 3327051 in which the spring force is applied to the locking bolt via an operating ring and a detent structure disposed therein, the spring force is utilized to rotate an eccenter shaft which is adapted to move the safety bolt into its end position. The arrangement as disclosed permits the use of a relatively small operating lever for the compression of the spring which lever may be so arranged that it is tiltable such that rotation of the eccenter shaft or rather insertion of the safety bolt cannot be obstructed.

It is pointed out however that, with all these arrangements, a part of the operating forces acting on the ball carrying bar, especially the push and pull forces acting in longitudinal direction of the ball bar, have to be taken up by the safety bolt. While the safety bolt may of course be made strong enough such that operational safety of the system is not directly jeopardized, it would be appropriate if the safety bolt would not at all be subjected to operational forces and would serve only to secure the ball bar in a position in which the ball bar is adapted to directly transmit forces to the support tube.

The arrangement according to DOS No. 1655012 is safe for its intended use if the safety bolt is properly positioned in its lock position but it is not rattle free. With this arrangement there is some clearance between the cavity on the ball bar and the safety bolt which permits back and forth movement of the ball bar within the support tube so that with each change of direction of the load on the ball bar there is a jerk on the support tube and the vehicle which results not only in a dynamic load of the parts but also in noise and an annoying sensation to the driver.

In all designs described so far, the ball bar is externally locked by the safety bolt. The height of the whole design is therefore determined by the height dimension of the support tube plus any additional dimensions of the safety bolt. However the space available for mounting of a hitch together with its support tube on a vehicle is very limited especially as far as height is concerned so that frequently problems are encountered when hitching structures are to be mounted on vehicles.

It is therefore an object of the present invention to provide a trailer hitch with reduced design height requirements when compared with prior art arrangements.

It is also an object of the invention to provide a hitch design wherein, upon insertion of the ball carrying bar into the support tube, the safety mechanism is activated by automatic movement of a safety bolt into its end position without the need for manual activation and without the danger that operation of the safety mechanism is inhibited by any means that may come into its path of movement particularly not by dirt or corrosion deposits. Also, the safety member should not be subject to any operating forces acting longitudinally on the ball bar or the support tube, that is, it should serve only to insure engagement of the ball bar with the support tube.

It is finally a further object to provide a hitch arrangement which remains free of rattles over its lifetime.

SUMMARY OF THE INVENTION

In a trailer hitch for a motor vehicle which includes a hitch ball bar removably supported by a support tube structure which is mounted to a vehicle there is provided an engagement structure which firmly locks the ball bar to the support tube structure with the aid of a safety bolt that is axially movably disposed in the ball bar and has a head projecting from the ball bar within the tube structure to lock the ball bar with an engagement structure therein. Both the head and the support tube structure have wedging means which prevent rattling of the ball bar in the support tube structure. Further safety means are provided to prevent disengagement of the safety bolt when a trailer tongue is placed onto the hitch ball and also to prevent the placement of a trailer tongue onto the hitch ball when the ball bar is not firmly locked in place in the tube support structure.

In contrast to earlier arrangements, the safety bolt in accordance with the trailer hitch arrangement according to the invention is not disposed on the outside of the ball bar but is movably disposed in a longitudinally extending passage within the ball bar together with a spring adapted to move the safety bolt toward its locking end position. Enclosed in the ball bar the safety bolt is protected from dirt and corrosion and requires the least possible space so that the ground clearance of the vehicle with the trailer hitch installed is only minimally reduced. The safety bolt may be operated, that is, disengaged, by an operating lever whose shaft extends through the ball bar and which can be easily and securely sealed to prevent dirt or water from entering. At the same time there is provided only a minimum number of elements to be moved so that the frictional forces which must be overcome for the insertion of the ball bar into the support tube or its removal therefrom are also relatively small. The relatively small forces required also permit the use of a relatively small operating mechanism which may be so arranged that it will meet the objects of the invention. It may also be noted that the safety bolt will only insure proper engagement of the ball bar with the support tube and will lock the ball bar in the support tube; it will not be subjected to the operational forces of the hitch which extend lengthwise through the hitch structure. The particular way in which the ball bar is engaged will also prevent rattling of the hitch.

Experiments with the hitch arrangement according to the invention have in fact shown that, with the hitch according to the invention, the ball carrying bar:

1. is safely retained in the support tube and in a rattle-free manner simply by inserting the ball bar into the support tube without the need for additional manipulations, 2. remains locked even without any safety elements, 3. remains functional and is not affected by dirt or corrosion, and 4. can be installed easily together with its support tube because of the low height of the assembly.

Engagement of the ball carrying ball with the support tube is achievable principally in two ways:

1. Tensional engagement of the ball carrying bar in the support tube structure between the bolts engaging the front end of the support tube and the safety bolt head engaging the ball carrying bar at its front end, or 2. Compressive engagement of the bolts engaged by a hook member internally projecting from the support tube and the engagement surface which is forced onto the front surface of a locking member as a result of the saftey bolt's position between the ball carrying bar and the angled stop.

In either case, the ball carrying bar is so engaged within the support tube that it is safely anchored within the support tube but nevertheless is easily releasable. Also, the mechanism provides for a rattle-free connection between the two hitch components.

In order to prevent disengagement of the safety rod from its locking position between the ball bar and the support ramp or block in case of breakage of the retaining spring or other safety mechanism intended to retain the safety rod in its locking position, the head portion of the safety rod as well as the corresponding resting surface of the support ramp are inclined at an angle opposite to that of the ramp incline wherein the angle may be between $-30°$ and $+10°$, preferably about $0°$ with respect to a plane receiving the ball bar axis.

Tests of the arrangement according to the invention have shown that retraction of the safety bolt is avoided even with strong vibrations if the flattened or inclined head portion of the safety rod abuts a corresponding resting surface of the support block because the safety bolt is not subjected to any axial forces so that it will remain in its locking position once this position is assumed. If the resting surface is inclined slightly at a negative angle, the safety rod is practically locked in position and can be removed from its locking position only by external forces, that is, only when it is removed by an operator.

It is further possible to insure retention of the safety bolt in its locking position by providing a support ramp with a resting surface angle adapted to provide for self-locking characteristics. This will not only retain the safety bolt but will also permit the use of a relatively weak engagement spring so that the operating mechanism becomes quite easy to handle by an operator. In order to prevent wedging of the safety bolt head which might make it difficult to release the safety bolt from its locking position, the support surfaces for the safety bolt head or the respective safety bolt head surfaces may be provided with means that facilitate its release, for example, resilient spring means which tend to disengage the bolt head from the support surfaces or a body of elastomeric material of low friction may be disposed between the bolt head and the support surfaces.

For the operation of the safety bolt, that is, for its movement out of its locking position, the ball carrying bar may have a side opening with an operating arm mounted on the bar and extending through the opening so as to engage the safety bolt therein. The operating arm in turn may be lockable when in engagement with the safety bolt while the safety bolt is in the locking position.

Additional measures may be provided to safeguard the safety bolt or the operating arm. Specifically, a mechanism may be provided which permits a trailer tongue to be placed onto the hitch ball of the ball bar only when the ball bar safely rests and is fixed in the support tube and that removal of the ball bar from the support tube is possible only when the trailer tongue is removed from the hitch ball.

An arrangement which safeguards the arrangement in the manner described may include for example, a pivot arm which is associated with the safety bolt but pivotally supported on the ball bar remote from the ball and having a bifurcated free end which extends around and below the ball when the ball bar is locked in engagement with the support tube.

The concept underlaying this particular embodiment is that in addition to all the safety features described above, the safety rod can be operated only when the operating arm for the safety rod can be moved, that is, only when the trailer tongue is removed from the trailer hitch ball. The pivot arm which may be connected with the operating arm may at the same time serve as a power arm for the operating lever because of its greater length such that operation of the operating lever is greatly facilitated.

It is also possible to provide the opening in the ball bar for the engagement of the safety bolt therein on the same side as the ball is located, that is, on the top side, on which side the operating lever would then also be located, instead of on the side of the ball bar. This permits the use of a long operating lever bent over so as to extend around the hitch ball.

The given first embodiment provides for a utilization of the previously described safety bolt operating arm by way of the operating lever. As a result there is now no need for an additional safety mechanism for the safety bolt operating arm so that as another embodiment there may be provided a two-armed operating lever which engages the safety bolt directly and which upon pivoting thereof retracts the safety bolt. Pivoting of the operating lever and retraction of the safety bolt however is—like before—only possible when the trailer tongue is disengaged from the hitch ball. In both cases the trailer tongue can be placed onto the hitch ball only when the operating arm is in a safety bolt locking position and the ball bar can be removed from the support tube only when the trailer tongue is removed from the hitch ball. With this arrangement, operation of the safety bolt is greatly facilitated.

EP-PS No. 93795 shows a similar pivot lever which, like the operating lever just described in connection with the invention, extends around the ball bar in the vicinity of the hitch ball. In contrast to the arrangement according to the invention, this lever is not a locking safety bolt operating lever but it is merely a passive safety device for a locking element wherein the lever in its safeguard position, for example, covers the slide-in passage of a locking bolt.

In the arrangement according to the invention, in contrast, the operating lever is directly, or by means of an auxiliary lever, engaged with the safety bolt, that is, it is itself an active part of the locking mechanism. The direct or indirect operative engagement of the operating lever with the safety bolt in the ball bar will provide an indication for the position of the safety bolt in the support tube but also provides for active locking of the safety bolt.

Another embodiment for a safety mechanism is obtained by providing a passage which extends through the whole ball bar and also through the hitch ball, which passage is in communication with the bar that receives the safety bolt and which receives force transmitting elements such as balls or a ball chain and a spring-loaded hold-down bolt for operative engagement with the inner end face of the safety bolt.

With this arrangement the hole-down bolt serves as a locking mechanism for the safety bolt by way of the force transmitting elements and also as an indicator whether the ball bar is properly positioned and locked by the safety bolt. Upon insertion of the ball bar into the support tube, the safety bolt is normally pushed back when abutting the support block whereby the hold-down bolt is pushed out of the hitch ball. Only when the safety bolt has moved to its locking position between the ball bar end piece and the support ramp or block, the hold-down bolt returns to its retracted position within the hitch ball thereby indicating locking of the ball bar within the support tube. At the same time the hold-down bolt prevents the placement of a trailer tongue onto the hitch ball as long as it projects from the hitch ball, that is, when the ball bar is not yet properly locked, so that unsafe handling is prevented. Also the arrangement prevents removal of the ball bar as long as a trailer tongue is disposed on top of the hitch ball since under this condition the hold-down bolt cannot project from the hitch ball as it must for unlocking the ball bar from the support tube.

As a result also this arrangement provides for effective unambiguous locking of the safety bolt in its locking position and therefore provides for an additional safety mechanism so that an additional external safety mechanism would not be necessary and could be eliminated. The arrangement is furthermore quite inexpensive and also lightweight.

Also the operating lever for the safety bolt may be eliminated if other means are provided that permit the movement of the safety bolt out of its locking position such as a slot or a threaded section by which the safety bolt can be engaged for retraction. There could simply be provided a nut provided with a handle which can be screwed onto the hold-down bolt so that the hold-down bolt can be pulled and, together therewith by way of the ball chain, the safety bolt can be pulled out of its locking position. The ball chain may be formed, for example, by a cable extending between the safety bolt and the hold-down bolt and extending through the bore in the ball disposed side-by-side in the ball bar central passage.

It would, of course, be possible to use a simple operating cable without the balls with which pressure may be applied if the passage walls engage the cable. Pulling is possible simply by pulling of the cable. A ball chain permits the transmission of pushing and pulling forces and is operative with relatively low forces since friction at the passage walls is low. There may also be provided a link chain which may also transmit pressure forces when the link chain is disposed in a closely fitting passage. It is advisable to use commercially available link chains and provide a passage in the ball bar with squared cross-section.

It is repeated that all of the last-mentioned arrangements will signal proper engagement of the ball bar in the support tube and that they will permit placement of the trailer hitch tongue onto the hitch ball only when the ball bar is properly positioned and locked in the support tube and that further unlocking and removal of the ball bar from the support tube is possible only when the trailer hitch tongue is removed from the hitch ball.

The support tube is preferably a structure formed in a tube section of oblong cross-section with side portions disposed therein between which the ball bar is received. The ball bar may have projections with threaded openings in an area adapted to project into the square when they are bolted to the square tube, the square tube facilitating the mounting of the hitch to a car.

SHORT DESCRIPTION OF THE DRAWINGS

DESCRIPTION OF PREFERRED EMBODIMENTS

Figure 1:
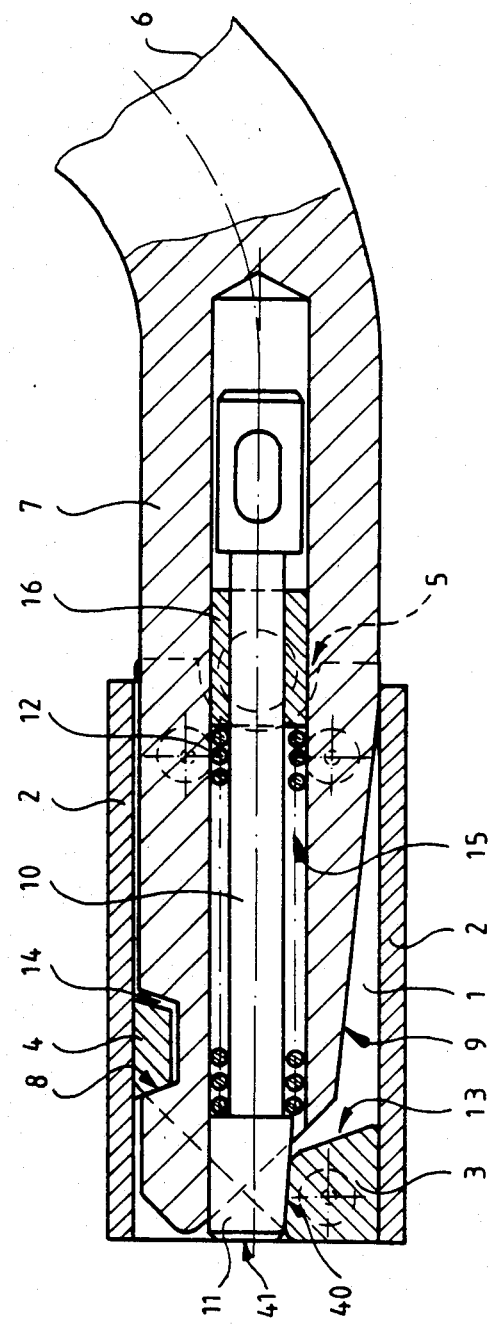
FIG. 1 is a cross-sectional view along the axis of the ball bar and the support tube in a vertical plane.

Mounted to the rear of a vehicle is a support tube 1 mounted to a square tube 2. The support tube 1 has an open end for the reception of a ball bar 7 and at the opposite end a support ramp or block 3. Opposite the support block 3 at one end thereof, the support tube 1 is provided with a locking member 4. At the other end the support tube 1 has semicircular recesses 5 (shown in dashed lines). The support tube so formed is adapted to receive a ball bar with a shaft end 7. The ball bar shaft end 7 has formed at its upper side adjacent its end a cavity 14 which receives the locking member 4 when the ball bar 7 is fully inserted into the support tube 1. In order to facilitate insertion of the ball bar shaft end 7 into the tube 1, the ball bar 7 is sloped at 9 so that the height of the shaft end is smaller than the space between the bottom side of the tube 1 and the lock member 4 in such a manner that the ball bar can be fully inserted into the support tube structure 1 which also provides for only little height requirements for the hitch structure. At the end the ball bar is wedge-shaped in order to guide and force the bar onto the support block 3 and into its operating position in which the locking member 4 is disposed in the cavity 14.

Upon insertion of the ball bar 7 the head 11 of the safety bolt 10 abuts the front side 13 of the support block 3 so that the safety bolt 10 is forced backwardly against the force of a spring 12 into its retracted end position. Because of the inclination of the front side 13 of the support block 3, the end of the ball bar is guided upwardly until the locking member 4 enters the cavity 14 and, at the same time, the safety bolt 10 under the force of the spring 12 moves forwardly over the support block into the position as shown in FIG. 1. In this position the ball bar is then locked for pull against the insert direction as well as push in the insert direction since the safety bolt 10 will safeguard the ball bar in its engaged position. With this arrangement alone however the hitch would not be rattle free. A rattle-free connection is achieved by engagement of the ball bar 7 in the tube structure 1 by way of two stand sections projecting sidewardly from the ball bar and being received in the semicircular recesses 5 formed in the support tube structure in such a manner that the ball bar is firmly engaged between the semicircular recesses 5—for pushing—and the rear wedging end wall 8 of the cavity 14 which abuts the rear end wall of the locking member 4. In this position the ball bar is firmly braced since the bottom of the ball bar head 11 is slightly inclined so that when the ball bar head 11 moves onto the support block 3 under the force of the spring 12, the ball bar shaft 7 is forced upwardly toward the locking member 4. As a result the inclined end wall 8 of the cavity 14 is forced into contact with the correspondingly inclined rear wall of the locking member 4 so that the ball bar 7 is pulled fully into the support bar structure until the side studs are firmly received in the semicircular recesses 5 and the ball bar is firmly engaged with the locking member 4. Of course, other engagement means may be utilized such as wedges which extend into appropriate cavities or other stop members which may simply engage the front wall of the support tube structure. Such stop member may be disposed at the front end of the ball bar and may be adjustable in its length in order to provide for appropriate engagement of the ball bar in the support tube structure with the locking member 4.

Figure 2:
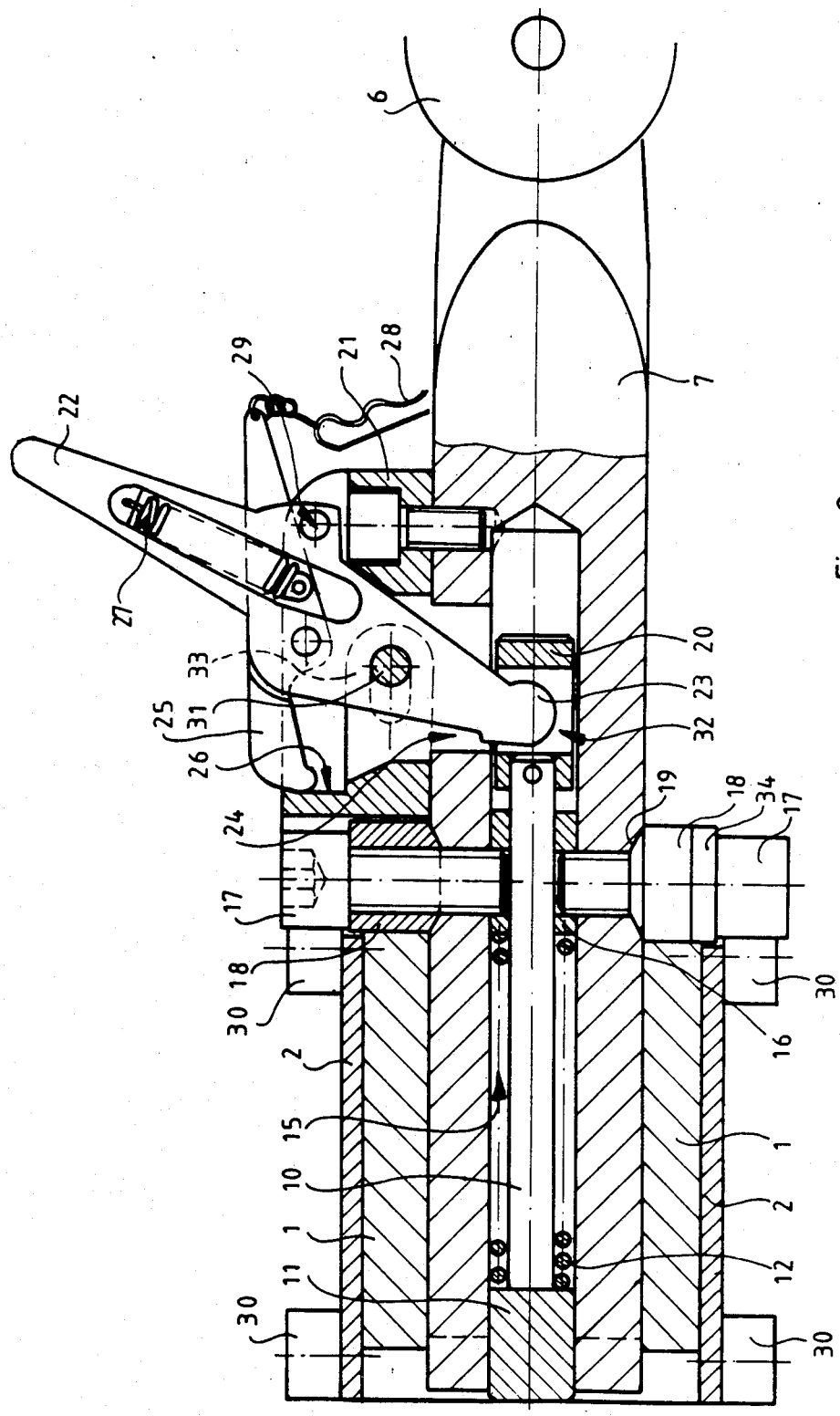
FIG. 2 is a cross-sectional view thereof in a horizontal plane.

It is noted that the ball bar remains securely locked in the support tube 1 even when the spring 12 breaks since the safety bolt 10 remains in its locking position as shown in FIG. 1 by retaining means to be described. Even upon slight retraction of the safety bolt 10 the ball bar 6 will still be retained safely in the support tube structure 1 since the ball bar shaft end 7 is locked by the safety bolt head 11 disposed between the support block 3 and the inner surfaces of the ball bar passage 15 although the arrangement may then not be free of rattles. For supporting the safety bolt axially movably in the axial passage 15 in the ball bar 7, there is provided a slide bearing 16 which, at the same time, forms the stop for the safety bolt 10 engaging spring 12. The slide bearing 16 is retained in its position by two threaded bolts 17 as shown in FIG. 2. The threaded bolts 17 extend through eccentric sleeves 18 provided with conical ends 19 seated in appropriated recesses formed in the ball bar shaft end 7. Rotation of the eccentric sleeves 18 by way of their engagement surfaces 34 permits adjustment of the optimum engagement position of the ball bar end 7 relative to the locking member 4 in a simple manner. Positive engagement of the eccentric sleeves 18 with the ball bar end 7 is always given by the seating of the conical ends 19 in the ball bar end 7.

At its end opposite the head 11 the safety bolt 10 carries an operating member 20 provided with a slot opening 32 into which a safety bolt lever 22 with a lever cam structure 23 projects, which lever 22 is supported in a housing 21. The slot opening 32 is in axial direction of the bolt 10 somewhat larger than the lever cam structure 23 in order to permit uninhibited axial movement of the safety bolt 10. The safety bolt lever 22 extends through an opening 24 in the ball bar 7 which is covered by the housing 21. The housing furthermore may be enclosed by a boot (not shown) as is common practice for the protection of components from dirt and water.

The housing 21 is firmly mounted, for example, bolted, onto the ball bar 7. The ball bar 7 together with the safety bolt 10, the bolt lever 22 and the housing 21 form a unitary structure which is removable from the support tube structure. The bolt lever 22 is further provided with a locking arm 25 which in its locking position abuts a wall 26 of the housing 21. In this position the locking arm is normally retained by a tension spring 27. There may be provided a further safety mechanism in the form of a safety pin 28 which may be inserted into a bore 29 extending in alignment through the bolt lever 22 and the housing 21 so that the pivoting of the locking arm 25 and also of the bolt lever 22 is prevented.

During insertion of the ball bar into the support tube structure 1 the locking arm 25 is above the housing wall 26 so that the bolt lever 22 can be pivoted. As described earlier the safety bolt 10 is pushed back in the passage 15 to its retracted end position when the ball bar is inserted into the support tube, which action also results in pivoting of the bolt lever 22. When the ball bar reaches its end position within the support tube, the safety bolt 10 under the force of the spring 12 jumps into its end position as shown in the Figures whereby the bolt lever 22 as well as the locking arm 25 are also moved to the positions shown in the Figures aided by a disengagement slide member 33 supported on the housing 21. The position of the ball bar end 7 within the support tube 1 is clearly determined in this manner and furthermore the ball bar is firmly engaged in a rattle-free manner.

For the removal of the ball bar 6 from the support tube 1 the locking arm 25 is pivoted out from its position adjacent the housing wall 26 so that by pivoting of the bolt lever 22 the safety bolt 10 is retracted to such an extent that the ball bar can be moved out of engagement with the locking member 4. The retraction is facilitated because the bolt lever 22 is supported on the disengagement slide member 33 which abuts the front face of the support tube 1 such that advance pivoting of the bolt lever 22 results in a pull out force for the ball bar end 7 from the support tube, that is, removal of the ball bar from the support tube. Movement of the ball bar out of the support tube is further enhanced by the safety bolt head 11 which will engage the end 13 of the support block 3 so that, upon release of the bolt lever 22, the spring 12 will push the safety bolt outwardly and the ball bar further out of the support tube. Removal of the ball bar from the support tube is greatly facilitated in this manner.

FIG. 2 shows also bolts 30 by which the rectangular tube section 2 is bolted to the support tube 1. The separation, in design, of the tube section 2 and the support tube 1 has the important advantage that the rectangular tube section may be welded to the support frame of a vehicle without any special provisions and the support tube 1 which is to be manufactured with high precision is mounted to the rectangular tube section. Warping of the structure as it might otherwise occur during welding is therefore safely prevented as far as the support tube 1 is concerned. In addition, such an arrangement facilitates the replacement of the hitch structure, that is, of the support tube with the ball bar, simply by mounting a new support tube on the rectangular tube section which is mounted or welded to the vehicle's rear end. It is also possible and in some cases economical to insert into the rectangular tube on the vehicle a ball bar which is not or not easily removable by bolting to the inner side walls of the rectangular tube section two thread plates.

It should generally be noted that the basic design feature of the present invention resides in the arrangement of the safety bolt movably in a passage within the ball bar and in its special shape and position which provides for firm positioning and locking of the ball bar shaft 7 within the support tube 1. Locking of the safety bolt in its ball bar retaining position in which the safety bolt head is disposed between the ball bar end portion and the support block can be achieved in various ways, one possibility, that is, locking of the safety bolt in its engagement position, being described already earlier.

Figure 3:
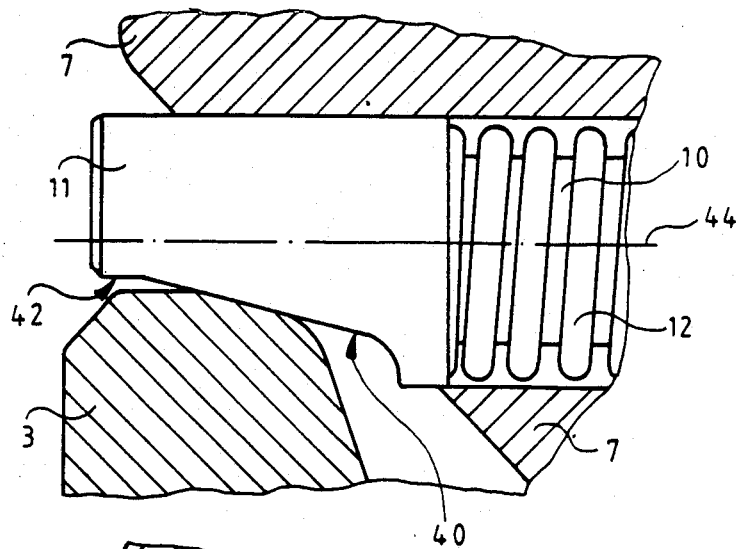
FIGS. 3 to 5 are views of the ball bar head in various positions.
Figure 4:
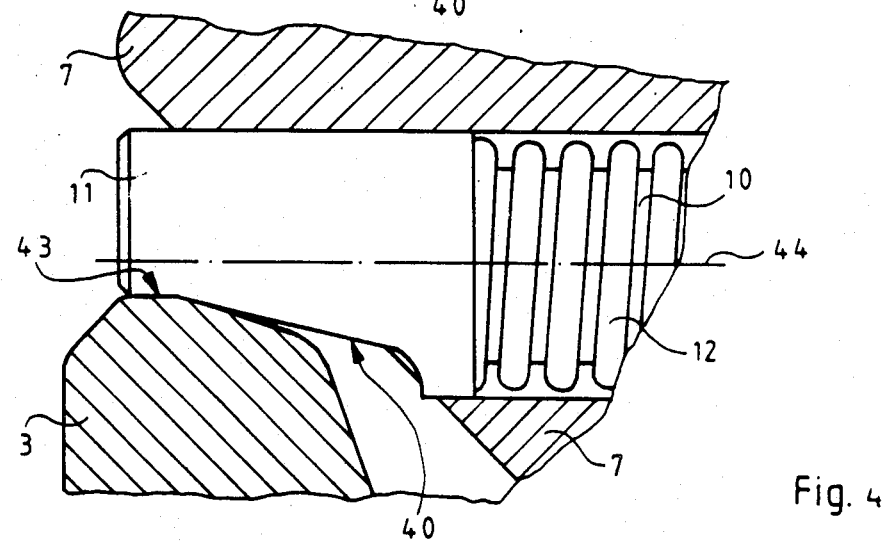
Figure 5:
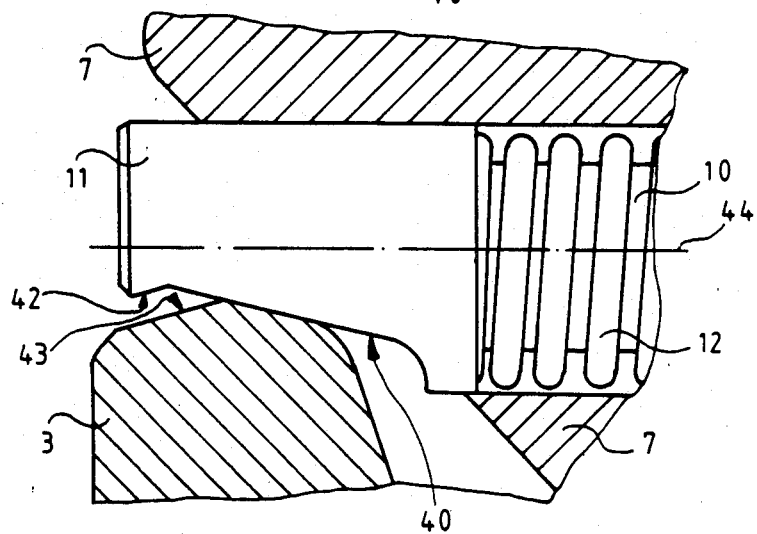

Another possibility is shown in FIGS. 3 to 5 wherein the safety bolt head 11 is shown having an inclined bottom surface 40 provided with an end area 42 and the support block 3 is provided with a resting surface 43 which are inclined with regard to the ramp area of the support block and the bottom surface 40 of the bolt head 11 so that even relatively strong vibrations normal to the axis of the safety bolt 10 will not move axially even if the spring 12 is broken and all the other safety mechanisms have failed. FIGS. 3 and 4 show the end area 42 and the resting surface 43 with an angle of 0° with regard to the axis 44 of the ball bar 7, wherein FIG. 5 shows an embodiment wherein the resting surface 43 is inclined at an angle of −15° with regard to the axis 44 of the ball bar 7. Tests have clearly shown that the safety bolt will not move further back even with large vibrational movements once it engages the resting surface 43 as shown in FIG. 4. This applies to embodiments with a resting surface angle relative to the ball bar axis 44 of 0° as well as it applies to embodiments with a resting surface angle of −15° as shown in FIG. 5. In the arrangement according to FIG. 5 the safety bolt 10 is actually locked in the position in which the end area 42 is disposed on the resting surface 43; unlocking is possible only by uplifting of the ball bar end.

The simple measure just described alone will insure that the safety bolt 10 will remain in its locking position between the ball bar end 7 and the support block 3 even when the spring 12 is broken, that is, when the spring 12 is inoperative, even if at the same time all the other safety mechanisms, as for example, the bolt lever 22, become inoperative.

Figure 6:
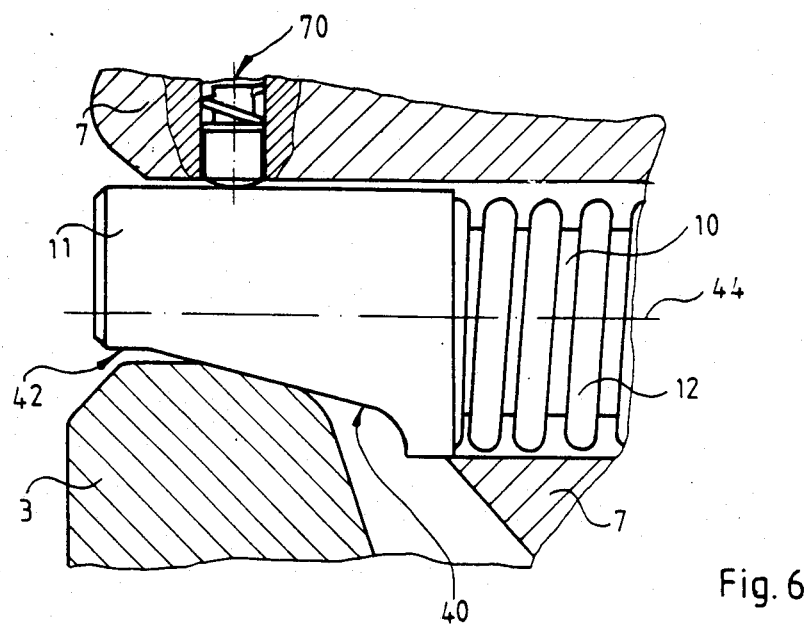
FIGS. 6 and 7 show means that facilitate insertion of the head.
Figure 7:
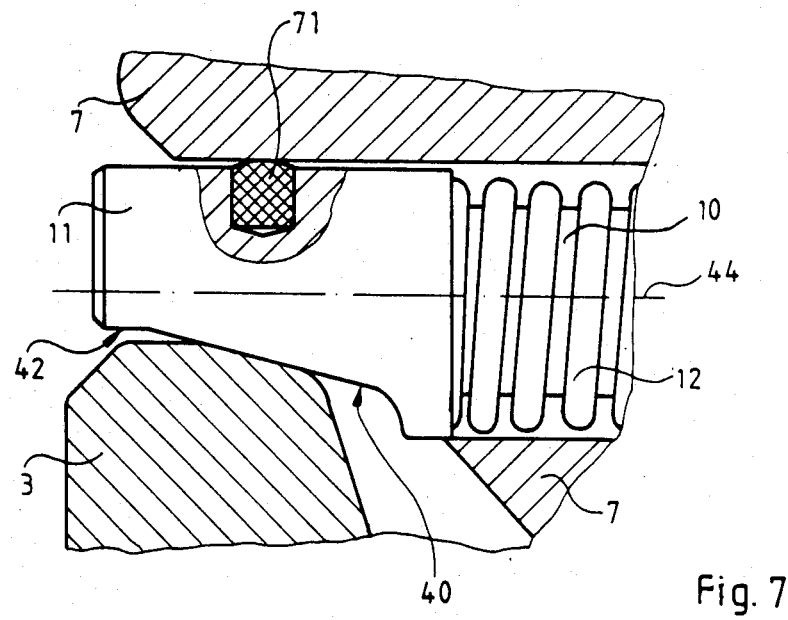

A further possibility for safeguarding the safety bolt in its position is shown in FIGS. 6 and 7. Here the angle of inclination of the bolt head's bottom surface 40 and the corresponding surface of the support block are in the range of a self-locking angle so that simply by the frictional self-locking, back sliding of the safety bolt is prevented. In order to maintain the forces required for pulling the safety bolt head out of its engaging position relatively low, there are provided spring members 70, 71 between the contact surface area of the bolt head and the ball bar end 7. FIG. 6 shows such spring member formed as a spring-load pin 70 and FIG. 7 shows an elastomeric member 71 disposed in a cavity in the safety bolt head.

Figure 8:
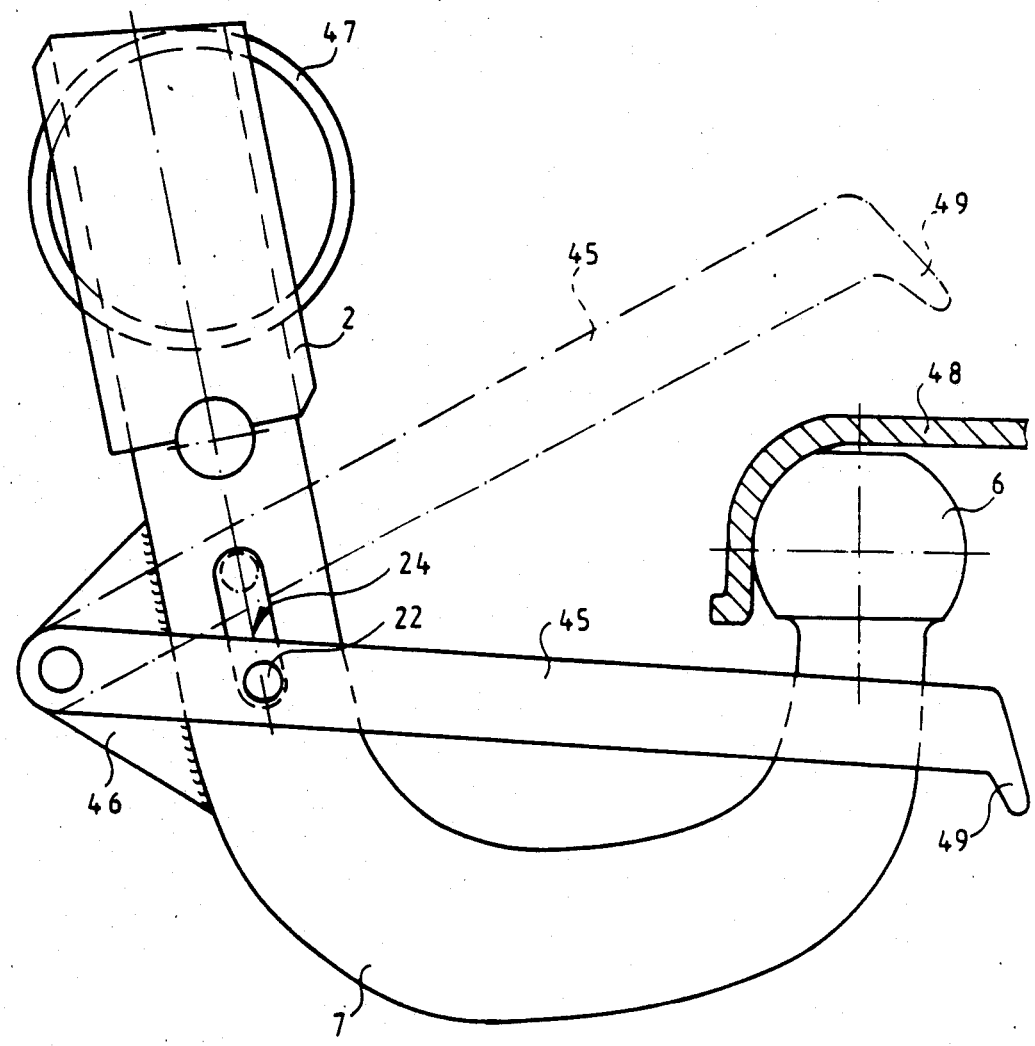
FIG. 8 shows an embodiment including an unlocking lever.

Another safety mechanism for locking the safety bolt 10 is shown in FIG. 8. In this arrangement the bolt lever 22 is combined with a disengagement lever 45 which is pivotally supported on a bearing bracket 46 projecting from the ball bar 7 in a direction opposite the hitch ball 6. Since as shown in, and described with respect to, FIG. 2, the bolt lever 22 must be moved toward the support tube in order to permit removal of the ball bar 7 from the support tube 1 which in the arrangement of FIG. 8 is shown mounted to a frame 47 by means of the rectangular tube portion 2, the disengagement lever 45 must be moved to the position indicated in FIG. 8 in dash-dotted lines to allow removal of the ball bar 7 from the support tube 1, that is, it must be pivoted over the hitch ball 6. This however is only possible when no trailer tongue 48 is disposed on the hitch ball 6. In order to prevent bending of the lever 45 to the side, the lever is provided with a cross member 49 thus encircling the hitch ball.

In this embodiment of the invention the disengagement lever 45 is connected to, or embodies, the safety bolt operating lever 22 which has associated therewith the safety mechanism described and shown in FIG. 2. It is noted however that the disengagement lever 45 may be a double arm lever which is pivotally supported on a bearing support bracket which projects from the ball bar toward the hitch ball and which is directly in engagement with the safety bolt 10 through the slot opening 24. Omission of the additional safety mechanisms associated with the operating lever 22 is justifiable since the disengagement lever 45 is extrememly sturdy and provides for safe locking.

Figure 9:
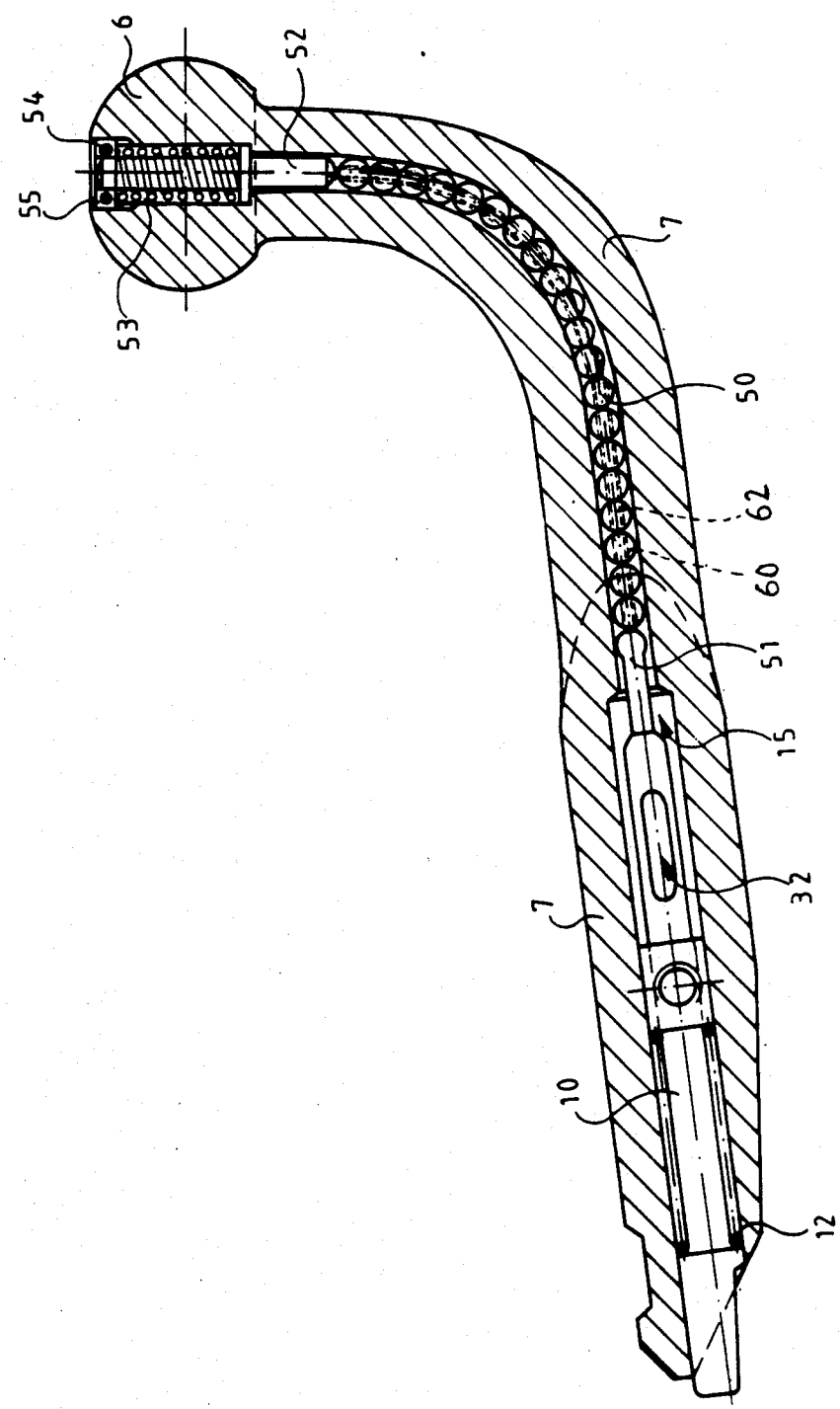
FIGS. 9 and 10 show ball bars with central passages.
Figure 10:
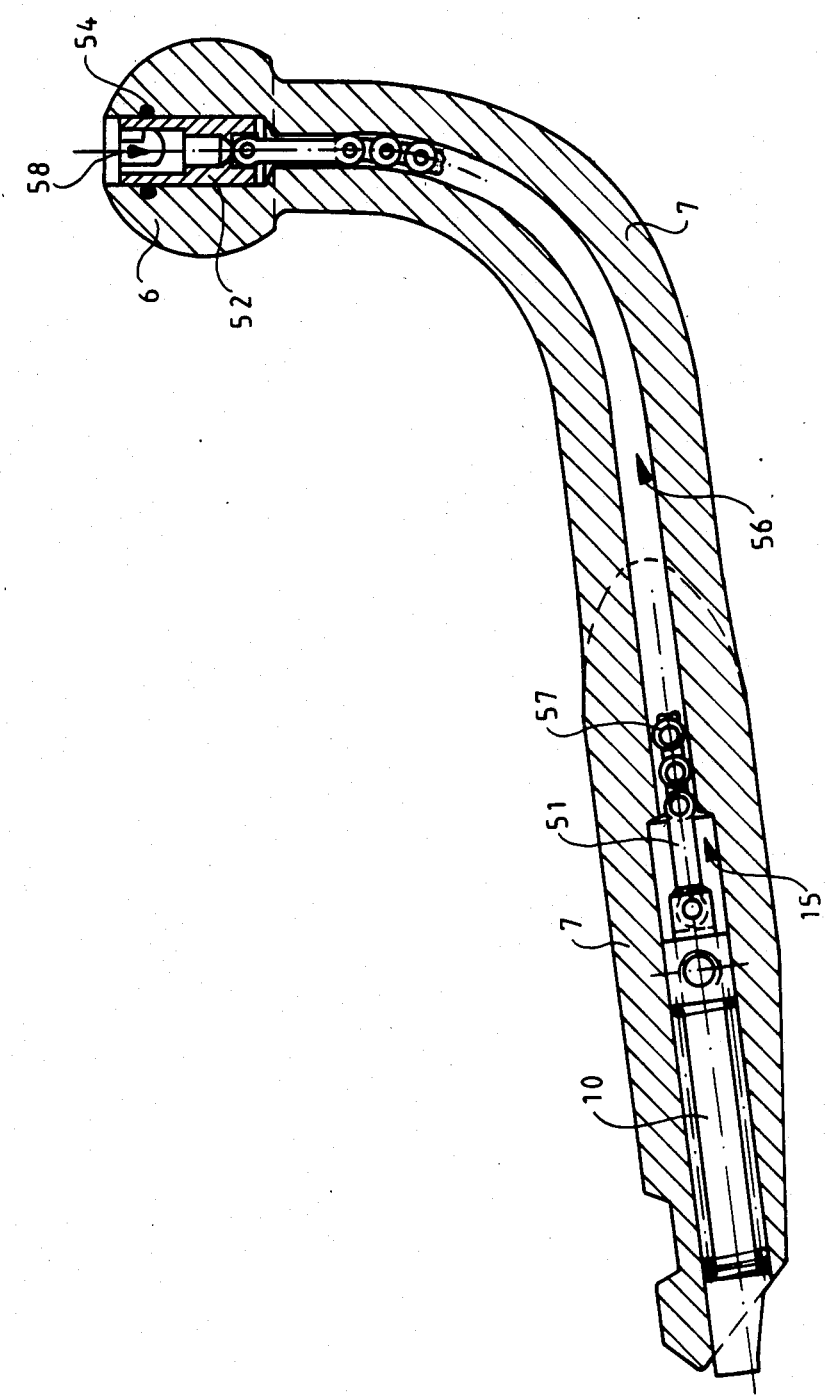

Another embodiment of the invention is shown in FIGS. 9 and 10 wherein the ball bar 7 and the hitch ball 6 have a central passage 56 extending therethrough all the way starting in alignment with the axis of the safety bolt 10 and wherein pull and push force transmitting elements are disposed in that passage. In the arrangement according to FIG. 9 the passage 15 receives balls 50 which abut at one end an operating pin 51 connected to the safety bolt 10 and at the other end of the passage 15 a spring-loaded operating bolt 52 axially movably disposed in the hitch ball 6. In operative position of the ball bar, that is, when the safety bolt projects from the ball bar and has its head between the ball bar end 7 and the support block 3, the operating bolt 52 is held in the hitch ball 6 by the spring 53, that is, in the position as shown in FIG. 9. If, however, the safety bolt is not in its locking position then the operating bolt 52 projects from the hitch ball 6 thereby indicating that the safety bolt is not properly in its end position in which the ball bar is locked. At the same time the projecting operating bolt 52 prevents proper placement of the trailer tongue onto the ball hitch. In order to prevent entry of water and dirt, etc., into the passage 15 in the ball bar 7, the operating bolt is sealed by an O-ring 54 which is disposed in the arrangement of nuts screwed into the hitch ball 6.

In order to permit also the transmission of pulling forces between the operating bolt 52 and the safety bolt 10, the balls 50 may be provided with bores 60 through which a pull cable 62 extends between the two bolts 10 and 52. FIG. 9 shows also the slot opening 32 in the safety bolt 10 into which the operating lever 22 as shown in FIG. 2 or another bolt operating mechanism may extend. However, with the arrangement just described, an additional safety mechanism is not necessary since the safety bolt is secured in its locking position whenever a trailer tongue 48 is disposed on the hitch ball since retraction of the safety bolt is then prevented by way of the balls 50.

Finally, FIG. 10 shows an embodiment wherein a link chain 57 is disposed in the passage 56. There is again provided an operating pin 51 and an operating bolt 52, the operating bolt 52 however having slots 58 formed therein forming bayonet engagement means by which a pulling device may be connected to the operating bolt 52. With this arrangement, a separate unlatching mechanism for pulling the safety bolt 10 of its locking position is needed since the safety bolt 10 can be pulled back by extracting the operating bolt 52 through the link chain or ball chain. The resulting design is very compact, neat and reliable and safely prevents undesired disengagement of the ball bar from the support tube structure. On the other hand, removal of the ball bar from the support tube is easily possible. However, such removal of the ball bar from the support tube is only possible when the trailer tongue 48 is removed from the hitch ball 6 and on the other hand placement of the trailer tongue 48 onto the hitch ball 6 secures the engagement of the ball bar 7 with the support tube 1.

Figure 11:
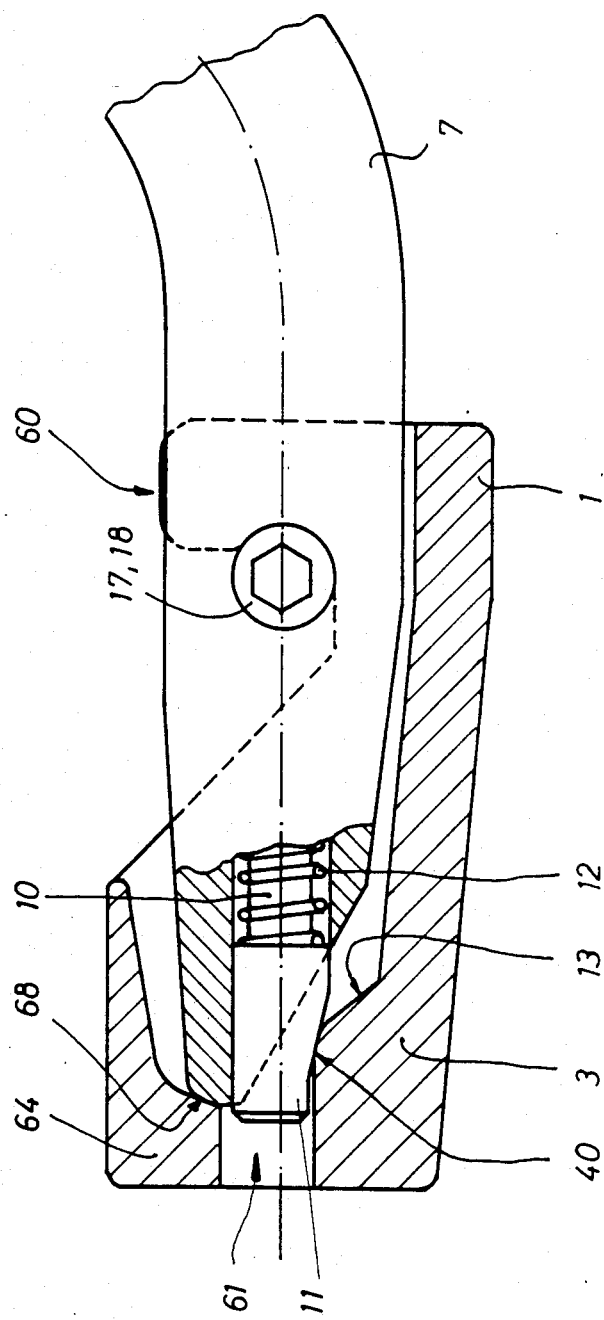
FIG. 11 shows an arrangement with a link chain in the central passage.

In order to prevent rattling the ball bar end is maintained under tensional stress in all the arrangements shown in FIGS. 1 to 10. However the same result may be achieved by maintaining the ball bar end under compressive stress as shown in FIG. 11. Here the support tube 1 is provided with engagement hooks 60 adapted to receive the eccentric sleeves 18 which are mounted to the ball bar by bolts 17 so as to project therefrom in opposite directions. Here again, upon insertion of the ball bar into the support tube 1, the safety bolt 10 is pushed back when its head 11 abuts the ramp 13 of the support block 3 until the ball bar 7 reaches about the position as shown in FIG. 11 in which the safety bolt enters the opening 61 between the support block 3 and the engagement member 64. Upon forward movement the safety bolt head 11 slides onto the inclined surface 40 of the support block 3 so that the end of the ball bar 7 is moved away from the support block 3 toward the engagement block 64. As a result the wedge surface 68 of the ball bar 7 is pushed onto the inclined face of the engagement block 64 and a bolt extending across the ball bar is wedged into firm contact with the engagement hooks 60 so that the ball bar 7 becomes firmly engaged with the ball bar support tube.

What is claimed is:

1. A trailer hitch for a vehicle, especially a motor vehicle, said trailer hitch comprising: a support tube structure adapted to be mounted to a vehicle body, a ball carrying bar removably supported in said tube structure, said tube structure having a projecting end with engagement surfaces and said ball bar having engagement bolts projecting therefrom in opposite directions and being arranged so as to be received and abut said engagement surfaces, a locking member disposed at the inner end of said tube structure and having a wedging wall face, a support block also disposed at the inner end of said tube structure opposite said locking member and having an inclined ramp area, and a safety bolt axially movably disposed within a passage in said ball bar and having a head adapted to project, under the force of a spring, out of said ball bar, said head having an inclined wedging surface corresponding to the ramp area of said support block so as to force said ball bar into firm engagement with said locking member's wedging wall face under the force of said spring, and means for locking said safety bolt in its outwardly projecting ball bar locking position.

2. A trailer hitch according to claim 1, wherein said engagement surfaces at the projecting end of said tube structure are recessed areas with inwardly inclined side faces.

3. A trailer hitch according to claim 1, wherein the end of the ball carrying bar is wedge-shaped and inclined at the lower side adjacent said support block.

4. A trailer hitch according to claim 2, wherein said engagement bolts are circular in cross-section and eccentric sleeves are disposed on said bolts, said eccentric sleeves being received in said recessed area and being rotatable for adjustment of the force of engagement with said inwardly inclined side surfaces.

5. A trailer hitch according to claim 1, wherein the end of said safety bolt head as well as the corresponding end section of the support block are inclined with regard to said wedging surface and said ramp area.

6. A trailer hitch according to claim 3, wherein the inclined end surface of said safety bolt and the corresponding section of said support block have an inclination of between minus 30° and plus 10° with regard to the axis of the ball carrying bar.

7. A trailer hitch according to claim 5, wherein said end surface of said safety bolt and the corresponding section of said support block extend parallel to the axis of the ball carrying bar.

8. A trailer hitch according to claim 1, wherein the ramp area of said support block and the wedging surface of said safety bolt head are inclined at an angle which provides for self locking.

9. A trailer hitch according to claim 8, wherein one of said safety bolt head's top surface and the adjacent surface area of said ball carrying bar has a cavity formed therein with a resilient member disposed in said cavity to facilitate disengagement of said safety bolt head from said ball bar surface.

10. A trailer hitch according to claim 1, wherein said ball carrying bar is provided with a slot and an operating lever is pivotally mounted on said ball carrying bar and has one arm extending through said slot into operative engagement with the safety bolt within said ball carrying bar for operating said safety bolt, and wherein a housing is mounted on said ball carrying bar so as to cover said slot and a disengagement member which extends fully to the free end of the support tube structure is slidably disposed in said housing and wherein said operating lever is pivotally mounted on said disengagement member and a spring-loaded locking arm pivotally supported in said housing and biased by said spring load into a position in which it is in locking engagement with said housing to prevent disengagement of said ball carrying bar from said support tube structure.

11. A trailer hitch according to claim 1, wherein a disengagement lever is pivotally mounted on said ball carrying bar at the side thereof opposite the hitch ball and which is linked to said safety bolt for operation thereof and, in the safety bolt locking position is pivoted over said hitch ball, said lever having at its end means extending around said hitch ball so as to be retained in position when a trailer tongue is disposed on said hitch ball.

12. A trailer hitch according to claim 1, wherein said safety bolt passage extends through the whole ball carrying bar and also through said hitch ball and that said hitch ball has axially movably disposed therein a spring-loaded operating bolt which is operatively connected to said safety bolt by means of a flexible shaft structure extending through said ball bar passage.

13. A trailer hitch according to claim 12, wherein said operating bolt is provided with engagement means adapted to permit gripping of said operating bolt for movement thereof.

14. A trailer hitch according to claim 1, wherein said tube structure is formed by a tube section of rectangular cross-section receiving sections of a support tube defining an opening for the reception of said ball carrying bar.

15. A trailer hitch for a vehicle, especially a motor vehicle, said trailer hitch comprising: a support structure adapted to be mounted to a vehicle body, a ball carrying bar removably supported on said support structure having a projecting end with upstanding hook portions provided with engagement surface areas arranged at their side facing the vehicle body and said ball bar having engagement bolts projecting therefrom in opposite directions and being arranged so as to be received by and abut the engagement surface areas of said upstanding hook portions, a wedging structure disposed at the mounting end of said support structure and having a wedging wall face facing away from said mounting end, a support block also disposed at the mounting end of said support structure and having an inclined ramp area, a safety bolt axially movably disposed within a central passage in said ball carrying bar and having a head adapted to project, under the force of a spring, out of said ball bar, said head having an inclined wedging surface corresponding to the ramp area of said support structure and said ball carrying bar having at its end an inclined face area adapted to engage said wedging wall, said head when being forced out of said ball bar forcing the end of said ball carrying bar away from said support structure and its inclined face in firm engagement with said wedging wall thereby forcing said engagement bolts into firm engagement with said upstanding hook portions thereby firmly securing said ball carrying bar with said support structure.

16. A trailer hitch according to claim 15, wherein said ball carrying bar is provided with a slot and an operating lever is pivotally mounted on said ball carrying bar and has one arm extending through said slot into operative engagement with the safety bolt within said ball carrying bar for operating said safety bolt, and wherein a housing is mounted on said ball carrying bar so as to cover said slot and a disengagement member which extends fully to the free end of the support tube structure is slidably disposed in said housing and wherein said operating lever is pivotally mounted on said disengagement member and a spring-loaded locking arm pivotally supported in said housing and biased by said spring load into a position in which it is in locking engagement with said housing to prevent disengagement of said ball carrying bar from said support tube structure.

17. A trailer hitch according to claim 15, wherein a disengagement lever is pivotally mounted on said ball carrying bar at the side thereof opposite the hitch ball and which is linked to said safety bolt for operation thereof and, in the safety bolt locking position is pivoted over said hitch ball, said lever having at its end means extending around said hitch ball so as to be retained in position when a trailer tongue is disposed on said hitch ball.

18. A trailer hitch according to claim 15, wherein said safety bolt passage extends through the whole ball carrying bar and also through said hitch ball and that said hitch ball has axially movably disposed therein a spring-loaded operating bolt which is operatively connected to said safety bolt by means of a flexible shaft structure extending through said ball bar passage.

19. A trailer hitch according to claim 18, wherein said operating bolt is provided with engagement means adapted to permit gripping of said operating bolt for movement thereof.

* * * * *